Patented Oct. 18, 1938

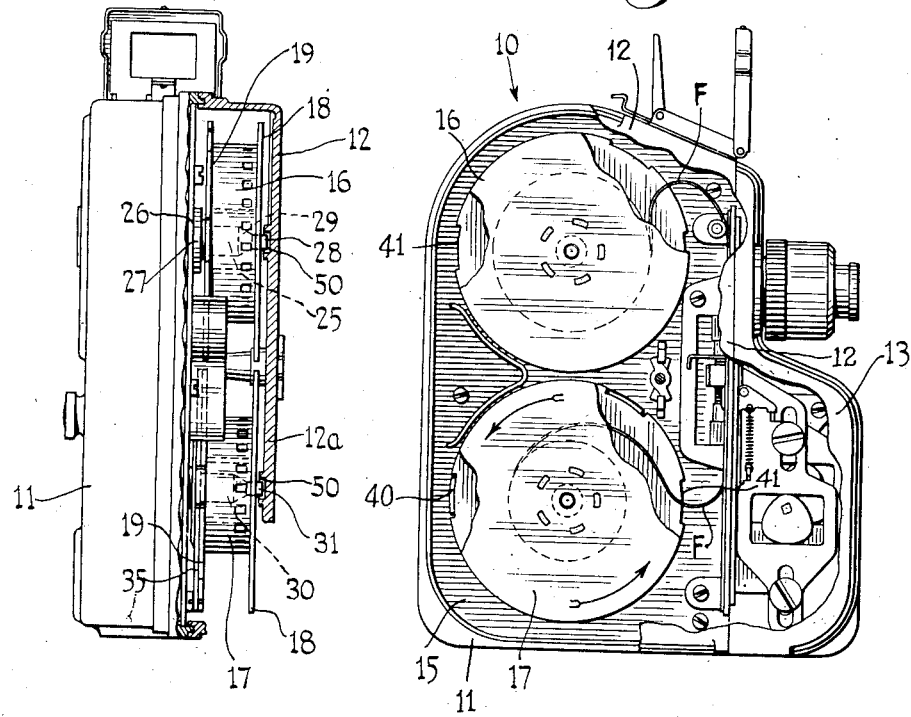
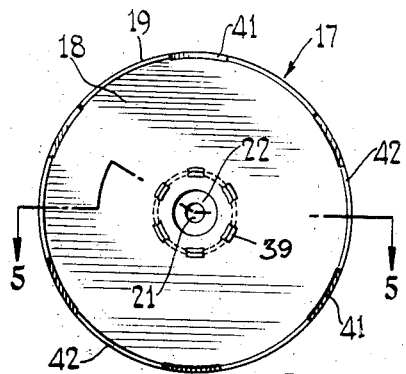
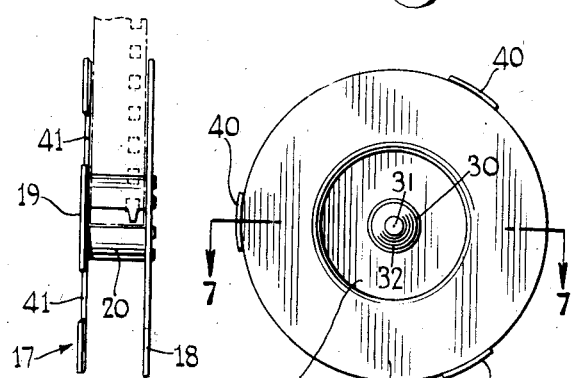

2,133,743

UNITED STATES PATENT OFFICE 2,133,743

MOTION PICTURE CAMERA

Otto W. Githens and George Kende, New York, and Everett M. Porter, Brooklyn, N. Y., assignors, by mesne assignments, to Universal Camera Corporation, New York, N. Y., a corporation of Delaware Application January 28, 1937, Serial No. 122,688

9 Claims. (Cl. 242—55)

This invention relates to motion picture cameras. More particularly, it relates to improvements in the construction of motion picture camera spools and spool chambers.

One of the objects of our invention is to provide in a motion picture camera of the character described an improved construction of the film spool chamber whereby the spools are readily accessible for removal and replacement.

Another object of our invention is to provide, in combination with a camera of the character described, a film take-up spool of novel construction, and improved means for driving said spool to obtain uniform winding of the film on the take-up spool.

Still another object of our invention is to provide a novel film spool and mounting therefor which is simple, yet rugged in construction, which is easy to assemble, which is relatively inexpensive to manufacture, and which at the same time operates with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Certain features shown and described but not claimed in this application are described and claimed in applicants' co-pending applications, Serial No. 121,488, filed January 21, 1937; Serial No. 128,728, filed March 3, 1937; and Serial No. 135,410, filed April 7, 1937, for Motion picture camera.

In the accompanying drawing, in which is shown one of the various possible embodiments of this invention, Fig. 1 is a side elevational view of a motion picture camera embodying our invention, with portions broken away disclosing the film spool chamber and the film spools in operative position;

Fig. 2 is an end view, partly sectional, of the camera illustrated in Fig. 1;

Fig. 3 is an enlarged detail side view of the film spools shown in Fig. 1;

Fig. 4 is an end view of the film spool shown in Fig. 3;

Fig. 5 is a cross-sectional view taken substantially on the line 5—5 of Fig. 3;

Fig. 6 is an enlarged detail side view of the mounting means for the film take-up spool; and Fig. 7 is a cross-sectional view taken substantially on the line 7—7 of Fig. 6.

Referring now in detail to the drawing, there is shown a motion picture camera 10, the mechanisms of which are housed in a three-part light-proof casing comprising the parts 11, 12 and 13, more fully shown and described in our co-pending application Serial No. 128,728 filed March 3, 1937 for Motion picture camera.

The casing as described in our above-mentioned co-pending application is designed so that the motor and driving mechanisms are housed as a unit in the casing part 11, the film feeding and shutter mechanism as fully described in our co-pending application Serial No. 121,488, filed January 21, 1937, for Motion picture camera is housed in the casing part 13, while the casing part 12 provides a light-proof film spool chamber 15 in which are housed the film take-off spool 16 and the film take-up spool 17. The film spools 16 and 17 are made of suitable rigid material, such as light metal, and comprise a pair of parallel annular disks 18 and 19 (see Figs. 4 and 5) interconnected in spaced relationship in any suitable manner by a hollow shaft 20 of usual film spool construction and adapted to have a film wound thereon between the spaced disks 18 and 19. The disk 19 is preferably slightly larger in diameter than the disk 18, for reasons which will become apparent as the description proceeds. The disk 18 is provided with a centrally disposed relatively small aperture 21, while the disk 19 is provided with a relatively large aperture 22 in alignment with the aperture 21. The spool 16 containing a roll of film F is freely mounted on a fixed shaft 25 which is fixed to a wall 26 of the motor and driving unit, (see Fig. 2) and is provided with an enlarged shoulder 27 adjacent said wall 26. The shoulder 27 serves as a seat for said spool 16 and also to space the same from the wall 26. The shaft 25 is provided at its upper end thereof with a portion 28 of reduced diameter, which is interconnected to the shaft 25 by a tapered portion 29. The aperture 22 of the spool 16 is designed to freely receive the shaft 25 while the aperture 21 is adapted to receive therethrough the shaft portion 28.

The above described construction of the apertures 21 and 22 and the shaft 25 are designed to facilitate the quick mounting of the film spools. The film F is adapted to be unwound from the take-off spool 16 and, after passing through the film passageway, to be wound up on the take-up spool 17.

The shaft 30 (see Fig. 7) upon which the spool 17 is adapted to be mounted, is similar in construction to the shaft 25, having a portion 31 thereof of reduced diameter, interconnected by a tapered portion 32. The shaft 30, however, is journalled in the wall 26 for rotation and is adapted to be driven by a frictional drive mechanism of a design, such as is fully shown and described in our said co-pending application Serial No. 135,410, filed April 7, 1937. The apertures 21 and 22 of the spool 17 are designed to freely receive the shaft portions 31 and 30, respectively, similar to the mounting of the take-off spool 16. To cause uniform rotation of the spool 17 with the shaft 30, we have provided the following construction:

Fixed to the shaft 30 for rotation therewith, is an annular plate or disk 35, adapted to serve as a seat for the spool 17 and being spaced from the wall 26, a distance substantially equal to the shoulder 27 so that when mounted on the shafts 25 and 30 the film spools 16 and 17 will be in proper alignment for the travel of the film. The disk 35 may be attached to the shaft 30 by any suitable attaching means, such as for example, providing the shaft 30 with a slightly enlarged portion 36, the upper shoulder of which is flattened over the top surface of the disk 35. The disk 35 may be provided with a centrally disposed recessed portion 38 sufficient to clear the prongs 39 used in assembling the disks 18 and 19 and the member 20 of the spool 17. To retain the film spool 17 in rotatable relationship with the disk 35, there are provided spaced projections 40, extending outwardly from the periphery of the disk 35, and upwardly with respect to the flat surface of the said disk 35. The projections 40 are designed to fit into correspondingly spaced notches 41 extending inwardly from the periphery of the disk 19 of the spool 17 to thus hold the spool 17 and the disk 35 in interlocked relationship. To aid in properly holding the spool 17 on the disk 35 the peripheral portions 42 of the disk 19 between the notches 41 are turned down slightly, such as for example, a distance on the nature of five-thousandths of an inch. If desired, the number of suitably spaced notches 41 in the disk 19 may exceed the number of projections 40 on the disk 35 to more readily mount the film spool 17.

After the film spools 16 and 17 have been properly mounted in the film spool chamber 15 in the manner above described, they are retained in proper position in the said chamber 15 by means of the wall 12a of the casing part 12, the inner surface of which may be provided with recessed areas 50 adapted to freely receive therein the shaft portions 28 and 31 which project through the apertures 21 in the spools 16 and 17, as clearly shown in Fig. 2. The amount of clearance for permitting movement of the spools 16 and 17 between the walls 26 and 12a of the film spool chamber 15 is designed to be less than the distance of the upwardly projecting portions 40 so that the film spool 17 will be prevented from becoming disengaged from the disk 35 while the camera is in use.

From the above described construction it is also seen that we have provided a novel arrangement for housing and mounting the film spools 16 and 17 so that the said spools are conveniently accessible for removal and replacement at all times. Heretofore, film spools have generally been sunken into a well portion of the camera casing, making it extremely inaccessible and inconvenient to get at. In the present invention, it is merely necessary to remove the casing part 12, shown partly broken away in Fig. 2 of the drawing, to permit easy grasping of the film spools for removal and replacement.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim, as new and desire to secure by Letters Patent:

1. In a camera, a film spool comprising a pair of spaced parallel interconnected disks, one of said disks being provided with a plurality of symmetrically disposed notches adjacent the periphery thereof, the portions adjacent the periphery of said disk between said notches being turned slightly upwardly, a rotatably mounted shaft, a plate fixed to said shaft for rotation therewith, the plane of said plate being substantially at right angles to the axis of said shaft, said spool being freely received on said shaft and adapted to rest on said plate, said plate being provided with a plurality of projections adjacent the periphery thereof adapted to be received in said notches for causing rotation of said spool with said shaft, said projections being turned slightly upwardly to facilitate interlocking of said notches and said projections, said notches being greater in number than said projections whereby to facilitate the registering of said notches and said projections.

2. In a camera, a rotatably mounted shaft, a circular plate fixed to said shaft for rotation therewith, said plate being provided with at least three outwardly and upwardly extending peripheral projections, and a film spool adapted to be received on said shaft and overlying said plate, said film spool comprising a wall provided with peripheral means adapted to cooperate with at least one of said projections for causing rotation of said spool.

3. For use in a camera having a rotatably mounted plate provided with a plurality of peripheral projections, a film spool comprising a pair of spaced parallel interconnected disks, one of said disks being adapted to rest upon said plate and provided with peripheral means cooperating with at least one of said projections for causing rotation of said spool with said plate.

4. For use in a camera having a rotatably mounted circular plate provided with a plurality of peripheral projections, a film spool comprising a pair of spaced parallel interconnected disks, one of said disks being substantially of the same diameter as said plate and being adapted to rest upon said plate and provided with peripheral means cooperating with at least one of said projections for causing rotation of said spool with said plate.

5. A film spool adapted for use in a camera having a rotatably mounted plate provided with a peripheral projection, said spool comprising a pair of spaced interconnected parallel walls, at least one peripheral notch in one of said walls, said notch being adapted to receive therein said plate projection whereby the driving force of said spool will be applied at the periphery thereof.

6. A film spool adapted for use in a camera having a rotatably mounted circular plate provided with a plurality of spaced peripheral projections, said spool comprising a flat wall provided with a plurality of peripheral notches adapted to receive therein said projections, whereby the driving force of said spool will be applied at the periphery thereof.

7. In a camera, a rotatably mounted shaft, a circular plate fixed to said shaft for rotation therewith, said plate being provided with a plurality of spaced peripheral projections and a film spool freely rotatable on said shaft and comprising a wall having peripheral means adapted to cooperate with said projections for peripherally driving said spool.

8. For use in a motion picture camera having a rotatably mounted plate provided with a plurality of peripheral projections, wherein said plate is adapted to be driven by a motor, a film spool comprising a pair of spaced parallel interconnected disks, one of said disks being adapted to rest upon said plate, said last named disk being provided with at least one peripheral notch, said notch being adapted to receive therein one of said plate projections for causing rotation of said spool with said plate.

9. For use in a motion picture camera having a rotatably mounted plate provided with a plurality of peripheral projections, wherein said plate is adapted to be driven by a motor, a film spool comprising a pair of spaced parallel interconnected disks, the diameter of said disks being substantially greater than the said space between said disks, one of said disks being adapted to rest upon said plate, said last named disk being provided with at least one peripheral notch, said notch being adapted to receive therein one of said plate projections for causing rotation of said spool with said plate.

OTTO W. GITHENS.
GEORGE KENDE.
EVERETT M. PORTER.